United States Patent [19]
Howe

[11] Patent Number: 5,378,114
[45] Date of Patent: Jan. 3, 1995

[54] GASEOUS FUEL INJECTION PUMP

[76] Inventor: William H. Howe, 256 Swift Street, Penticton.B.C., Canada

[21] Appl. No.: 11,857

[22] Filed: Feb. 1, 1993

[51] Int. Cl.$^6$ .......................... F04B 1/12; F02B 43/00
[52] U.S. Cl. .................... 417/269; 123/527; 123/450; 417/DIG. 1
[58] Field of Search ............... 123/450, 527; 417/DIG. 1, 269, 271

[56] References Cited

U.S. PATENT DOCUMENTS

| | | | |
|---|---|---|---|
| 2,251,552 | 8/1941 | Pordy | 417/269 |
| 2,458,294 | 1/1949 | Parker | 123/450 |
| 2,517,483 | 8/1950 | Haut | 417/269 |
| 2,571,571 | 10/1951 | Hanners | 123/527 |
| 2,786,460 | 3/1957 | Barfod | 123/450 |
| 2,867,198 | 1/1959 | Peras | 123/450 |
| 2,910,056 | 10/1959 | Sampietro | 123/450 |
| 4,403,586 | 9/1983 | Taniguchi | 417/DIG. 1 |
| 4,463,736 | 8/1984 | Hayward | 123/527 |
| 4,545,345 | 10/1985 | Pagdin | 123/527 |
| 4,701,110 | 10/1987 | Iiyima | 417/DIG. 1 |

Primary Examiner—Carl S. Miller

[57] ABSTRACT

A gas fuel injection pump including a pump body machined with a plurality of plunger sliding bores, the pressure head of which has side entry ingress passages and individual and separate discharge ports; including a means to actuate the plungers consisting of a rotating cam-spool suitably keyed and locked to the axial driven shaft which will connect by suitable means to the engine crankshaft so as to ensure the precise timing of the injection process. The plungers are sealed by rings of polyamide resin to obviate the leakage of any gas and also to act as sliding bearing surfaces to provide working clearances betwixt plunger and bore. Cam followers are interposed between the plungers and cam-spool to control sidethrust and ensure a satisfactory and maintenance free operation. Overall control of the pump, is defined by the capacity setting of the cam spool which determines the maximum amount of charge available to each engine cylinder: and adjustable stops on the inside wall of the outer casing; adjacent to the throttle body which limits and determines the travel of the throttle ring from idle to maximum power.

4 Claims, 2 Drawing Sheets

GASEOUS FUEL INJECTION PUMP

BACKGROUND OF THE INVENTION

This invention relates to a chambered metering device for use with Gaseous fuels.(solely). Devices that meter fluids (liquid fuel) for direct injection into combustion chambers have met with wide useage (CI. engines) and demonstrated that this method is not only efficient but allows greater economy of operation.

A later outcome is the application of this type of technology to gasoline fuelled Automobiles and trucks using Computer controlled electric solenoid type injectors. This does not however, overcome the latent disadvantages of Hydro-Carbon fuels in themselves; and it may well be that the use of clean burning Natural/Gas could provide a much better solution; to the pollution problems arising from the use of the former. It is apparent from previous well documented sources that most of the problems concerning combustion pollution is due to an over-rich mixture due to poor atomisation and insufficiency of oxygen, a deficiency that the injection process partly seeks to overcome. Whereas, the injection of N/gas with its very high Octane rating can be injected at a much lower level than stoichioemetric with resulting economy of operation and considerably lowered exhaust effluents.

SUMMARY OF THE INVENTION

A chambered metering pump contained within a cylindrical housing to accurately meter a gas, either volumetrically or by weight and comprising a cylindrical body wherein a plurality of radially disposed, circumferentially spaced bores are situate. An integral pressure head surmounts the body. Plungers of suitable size and working clearances are arranged in the bores and are actuated by a rotating cam-spool mounted on an axial, driven shaft which is itself supported by suitable ball or roller thrust races. Inlet passageways, drilled through the outer wall of the pump body allow the ingress of gas via check valves into the compression chambers of the bores. Outlet for the compressed gas is ported thru individual passages drilled thru the pressure head at the diametral centre of each bore and via equal length stainless tubing to each engine injector in accordance with the prescribed firing order of the engine served. The plungers are sealed and made slideable in their bores by the use of rings of polyamide resin, which not only seal the cylinders from leakage but maintain the working clearances and obviate seizure of the working parts. The pump is driven by a gear at the end of the axial shaft which either meshes with crankshaft driven gears on the engine; or roller chain or cogged belt. Compression springs, mounted externally on the pressure head engage with a throttle plate which communicates by rods thru passages in the pump body with an internal throttle ring. The throttle ring abuts the plungers at the outer ends and controls the return plunger movement in accordance with the power requirements of the engine and throttle setting. The throttle plate is also interconnected with a servo-mechanism and throttle over-ride linkage. The pump fits into a saddle bracket that bolts to the engine and is rotateable therein thereby allowing for the more precise timing and synchronicity of injection into the engine cylinders.

OBJECTS OF THE INVENTION

Therefore the objects of the invention are: to provide a metering device for gas fuels that will accurately dispense the correct weight or volume of gas to the injector nozzle and into the engine cylinder: the device itself being of simple design and cheap to manufacture, easily serviced when required and of robust construction so as to ensure long and trouble-free operation. Its widespread use would help to rid the major cities of the pollution created 'smog' and other noxious fumes that presently degenerates our atmosphere.

Other objects and advantages of this invention are: to easily convert CI.engines to Dual fuel engines with a better efficiency and economy of operation than heretofore, with all the advantages of the reduction of particulates, exhaust smoke and $No_x$. It will also allow for cheap and easy conversions of older carburetted engines to gas fuel injection with the injectors mounted into the inlet manifolds.

DETAILED DESCRIPTION OF THE PREFERRED EMBODIMENT

Figure 1:
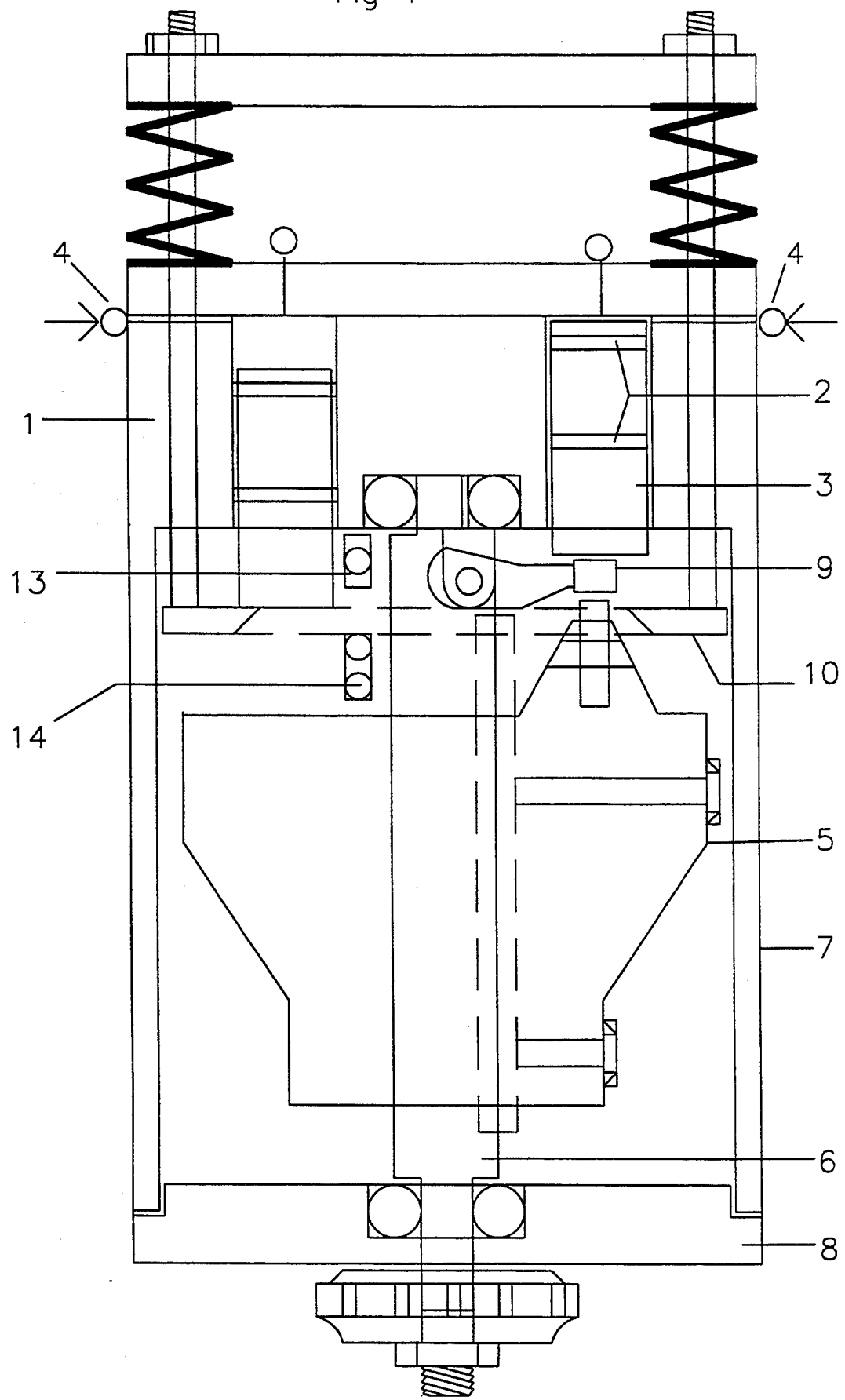
FIG. 1 is a cross-sectional view of the pump.
Figure 2:
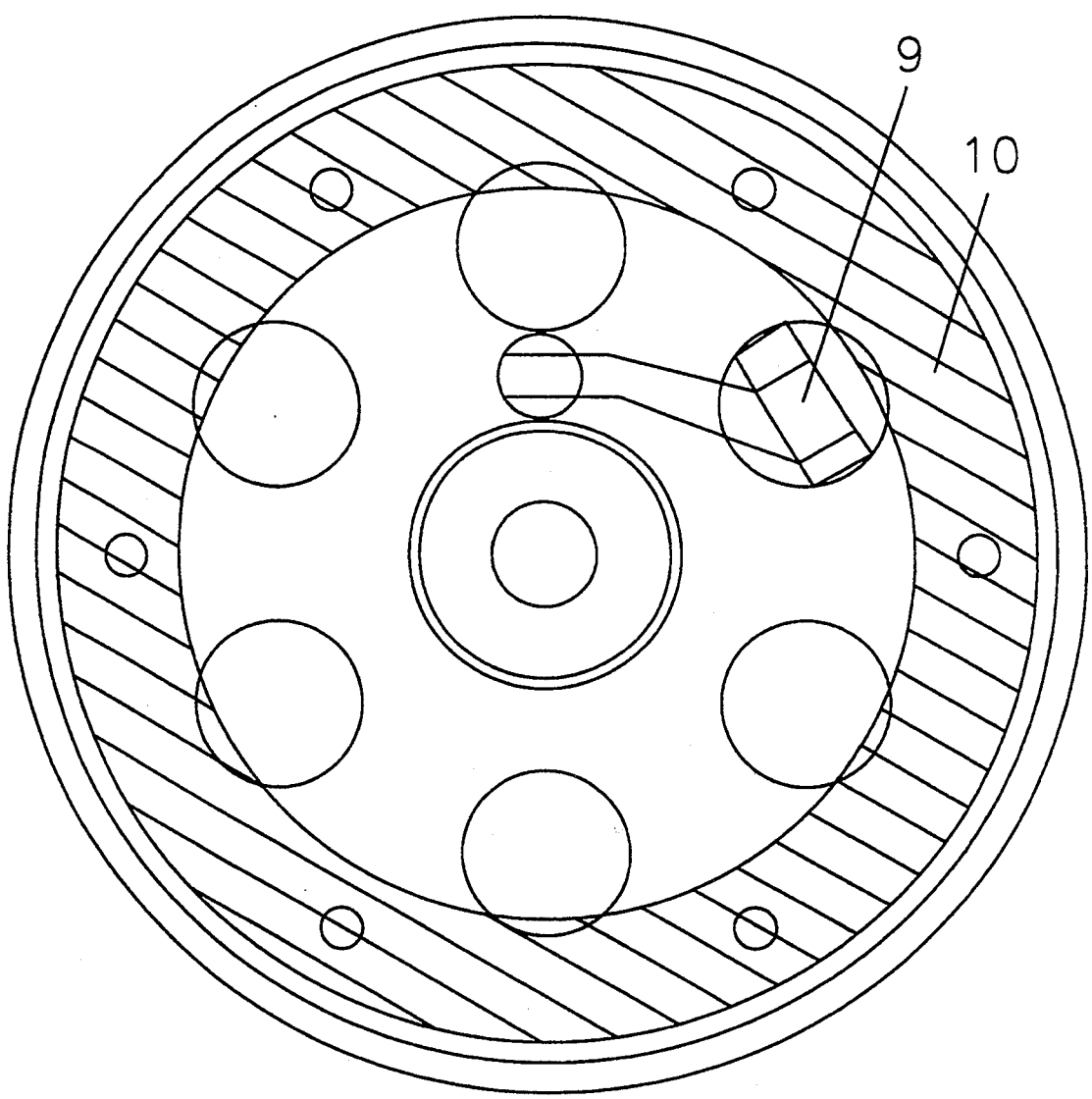
FIG. 2 is a bottom plan view of the pump body.

As required, detailed embodiments of the present invention are disclosed herein, however it is to be understood that the disclosed embodiments are merely exemplary of the invention and may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The reference numeral 1 generally designates a pump body with a plurality of bores and integral pressure head. The outer sleeve 7, generally encloses axial shaft 6 and the rotating cam-spool 5. It also carries at its end the rear housing plate 8 which incorporates the rear axial shaft bearing. External to which is the drive gear. The axial inner shaft bearing is mounted in the underside of the pump body. An external n/gas supply with an adjustable pressure regulator (not shown) connects to the pump inlet passages via interposed check valves 4. The regulated pressure forces the plungers back in their bores to the amount of stroke allowed by the throttle ring 10 which is under the control of a pressure servo (not shown) inter-connected to the throttle plate 12 and: throttle linkage over-ride.(not shown). The gas pressure not only pressurises the plunger bores but also the supply lines up to the injectors projecting into the cylinders of the engine. Throttle stops 13 & 14 limit the throttle ring travel and determine idle and full throttle settings. The plungers are fitted with circumferential and slidable seal rings of polyamide resin or other suitable material set into circumferential lands of the plunger. The seal rings serve two purposes, firstly to prevent leakage of the gas and secondly to act as durable slidable bearing surfaces that maintain working clearances and prevent metal to metal contact.

It is to be understood that while certain forms of the present invention have been illustrated and described herein, it is not to be limited to the specific forms or arrangements of parts described and shown.

What is claimed, is as follows:

1. A dry un-lubricated gaseous fuel injection device comprising:
   (a) a pump body having an integral housing and a plurality of chambered bores circumferentially spaced and axially aligned;
   (b) a cam-spool retained within said housing and adapted to a rotational motion about an axis to reciprocate a plurality of plungers in aforesaid bores, into a compression mode;
   (c) a keyed axial shaft onto which the cam-spool is slidable but incorporates a means to lock the cam-spool and thus govern the overall plunger stroke;
   (d) a sliding throttle ring that abuts the plungers at the outer end of the radial periphery of each and connects by attached rods to the external throttle plate.
   (e) said plungers of three piece construction so as to enable the fitment of machined polyamide resin seal rings that also act as slidable surfaces and create working clearances and obviate metal to metal contact.

2. The device set forth in claim 1 wherein;
   (a) said pump and housing is generally cylindrical; and
   (b) said bores are generally cylindrical and axially arranged on equal diametric centres.

3. The device set forth in claim 1 wherein;
   (a) said cam-spool is generally cylindrical and carries a sealed roller bearing on the inside face to engage the plunger followers and actuate the plungers into compression.

4. The device as set forth in claim 1 wherein;
   (a) said gaseous fuel is N/Gas, Hydrogen or Propane or any of other combustible gases.

* * * * *